(12) United States Patent
Krishnaiyer et al.

(10) Patent No.: US 7,155,575 B2
(45) Date of Patent: Dec. 26, 2006

(54) ADAPTIVE PREFETCH FOR IRREGULAR ACCESS PATTERNS

(75) Inventors: Rakesh Krishnaiyer, Santa Clara, CA (US); Wei Li, Redwood City, CA (US)

(73) Assignee: Intel Corporation, Santa Clara, CA (US)

( * ) Notice: Subject to any disclaimer, the term of this patent is extended or adjusted under 35 U.S.C. 154(b) by 255 days.

(21) Appl. No.: 10/323,226

(22) Filed: Dec. 18, 2002

(65) Prior Publication Data
US 2004/0123041 A1 Jun. 24, 2004

(51) Int. Cl.
G06F 12/08 (2006.01)
(52) U.S. Cl. .................. 711/137; 711/169; 712/207
(58) Field of Classification Search ............ 711/137, 711/141, 169; 710/110; 712/207
See application file for complete search history.

(56) References Cited

U.S. PATENT DOCUMENTS

| | | | | | |
|---|---|---|---|---|---|
| 5,778,435 | A | * | 7/1998 | Berenbaum et al. | 711/137 |
| 5,854,934 | A | * | 12/1998 | Hsu et al. | 717/161 |
| 5,941,981 | A | * | 8/1999 | Tran | 712/207 |
| 6,055,622 | A | * | 4/2000 | Spillinger | 712/207 |
| 6,079,006 | A | * | 6/2000 | Pickett | 711/213 |
| 6,134,643 | A | * | 10/2000 | Kedem et al. | 711/213 |
| 6,381,669 | B1 | * | 4/2002 | Chudnovsky et al. | 711/5 |
| 6,560,693 | B1 | * | 5/2003 | Puzak et al. | 712/207 |
| 6,571,318 | B1 | * | 5/2003 | Sander et al. | 711/137 |
| 6,609,168 | B1 | * | 8/2003 | Willke, II | 710/110 |
| 6,820,173 | B1 | * | 11/2004 | Bittel et al. | 711/137 |
| 2002/0095563 | A1 | * | 7/2002 | Chaudhry et al. | 712/207 |
| 2004/0006667 | A1 | * | 1/2004 | Bik et al. | 711/100 |
| 2004/0093591 | A1 | * | 5/2004 | Kalogeropulos et al. | 717/155 |

OTHER PUBLICATIONS

Tien-Fu Chen et al, "Effective Hardware-Based Data Prefetching for High-Performance Processors," IEEE Transactions on Computers, 1995.*
"Code Generation for Streaming: an Access/Execute Mechanism," by Manuel E. Benitez et al., XP 00203256, 8345 Computer Architecture News, Apr. 19, 1991, No. 2, New York, pp. 132-141.*
"Branch-Directed and Stride-Based Data Cache Prefetching", Yue Liu and David R. Kaeli, Prceedings of the International Conference on Computer Design (pp. 225-229), 1996.*
Krishnan et al., "Optimal Prediction for Prefetching in the Worst Case", DUKE-CS-93-26 pp. 1-24.*
"Compiler-Based Prefetching for Recursive Data Structures", Chi-Keung Luk and Todd C. Mowry, Department of Computer Science, Department of Electrical & Computer Engineering, University of Toronto, Toronto, Canada M5S3G4, pp. 1-12.

(Continued)

Primary Examiner—Pierre-Michel Bataille
(74) Attorney, Agent, or Firm—Blakely, Sokoloff, Taylor & Zafman LLP

(57) ABSTRACT

A computer program product determines whether a loop has a high usage count. If the computer program product determines the loop has a high usage count, the computer program product determines whether the loop has an irregularly accessed load. If the loop has an irregularly accessed load, the computer program product inserts pattern recognition code to calculate whether successive iterations of the irregular memory load in the loop have a predictable access pattern. The computer program product implants conditional adaptive prefetch code including a prefetch instruction into the output code.

17 Claims, 4 Drawing Sheets

OTHER PUBLICATIONS

"Compiler-directed Data Prefetching in Multiprocessors with Memory Hierarchies", Edward H. Gornish, Elana D. Granston & Alexander V. Veidenbaum, Center for Supercomputing Research & Development, University of Illinois at Urbana-Champaign, Urbana, Illinois 61801, pp. 1-15.

"Data Prefetch Mechanism", Steven P. VanderWiel and David J. Lilja, Department of Electrical & Computer Engineering, University of Minnesota, 200 Union St. SE, Minneapolis, MN 55455, pp. 1-25.

"Value Profile Guided Stride Prefetching for Irregular Code", Youfeng Wu, Mauricio Serranco, Rakesh Krishnaiyer, Wei Li, and Jessie Fang, Intel Programming Systems Research Lab, Intel Compiler Lab, 2200 Mission College Blvd., Santa Clara, CA 95052, pp. 1-17.

* cited by examiner

| Loop Iteration | X = 1 | X = 2 | X = 3 | X = 4 | X = 5 |
|---|---|---|---|---|---|
| Fig. 1(a) | 10 | 20 | 30 | 40 | 50 |
| Fig. 1(b) | 5 | 12 | 17 | 24 | 29 |
| Fig. 1(c) | 5 | 18 | 19 | 44 | 49 |

```
1)    p = head;
2)  while (p)
3)     {
4)     i = 1;
5)     pold = p;
6)     const_stride = TRUE;
7)     while (p && (i < NPROBE) )
8)        {
9)             i++;
10)            pstride = p - pold;
11)            if ( ( i > 3) && (prev_pstride != pstride) )
12)            {
13)                    const_stride = FALSE;
14)            }
15)            pold = p;
16)            prev_pstride = pstride;
17)            Work (p);
18)            p = p->next;
19)       }
20)    i = 1;
21)    while (p && (i<NLONG) )
22)       {
23)            i++;
24)            if (const_stride)
25)            {
26)                    prefetch (p + pstride*k + offset (field1));
27)                    prefetch (p + pstride*k + offset (field9));
28)                    ....
29)            }
30)            work(p);
31)            p = p-> next;
32)       }
33) }
```

FIG. 2

ADAPTIVE PREFETCH FOR IRREGULAR ACCESS PATTERNS

BACKGROUND

1. Technical Field

Embodiments of the present invention relate generally to data prefetching, and more specifically, to data prefetching during program runtime even though memory access appears irregular when statically analyzed at compile time.

2. Discussion of the Related Art

A gap in the performance speeds of microprocessors and Dynamic Random Access Memory (DRAM) devices has necessitated the use of aggressive techniques that are designed to either reduce or completely hide the latency of main memory accesses. Large cache hierarchies have reduced this latency for the most frequently accessed data, but scientific programs still may spend half of their run times stalled on memory requests. Data access stalls are a major performance-limiting factor in many software applications. Data prefetching is utilized to improve performance in such software applications by hiding the memory latency. Instead of waiting for a cache miss to initiate a memory fetch, data prefetching anticipates such misses and issues a fetch to the memory system in advance of the actual memory reference.

Data prefetching may be accomplished when the data addresses for specific memory loads may be predicted in advance by a computer program product, such as a compiler. Data addresses for specific memory loads may be predicted in advance specifically in scientific applications where regular data access patterns occur due to the use of data structures such as arrays. However, if the data accesses appear to be irregular, at least statically, i.e., during compile time, the compiler may not be able to predict addresses in advance.

BRIEF DESCRIPTION OF THE DRAWINGS

FIGS. 1(*a*), 1(*b*) and 1(*c*) illustrate successive iterations of memory loads according to an embodiment of the present invention;

FIG. 2 is a sample pseudo-code illustrating a specific embodiment of adaptive prefetching according to an embodiment of the present invention;

DETAILED DESCRIPTION

Figure 4:
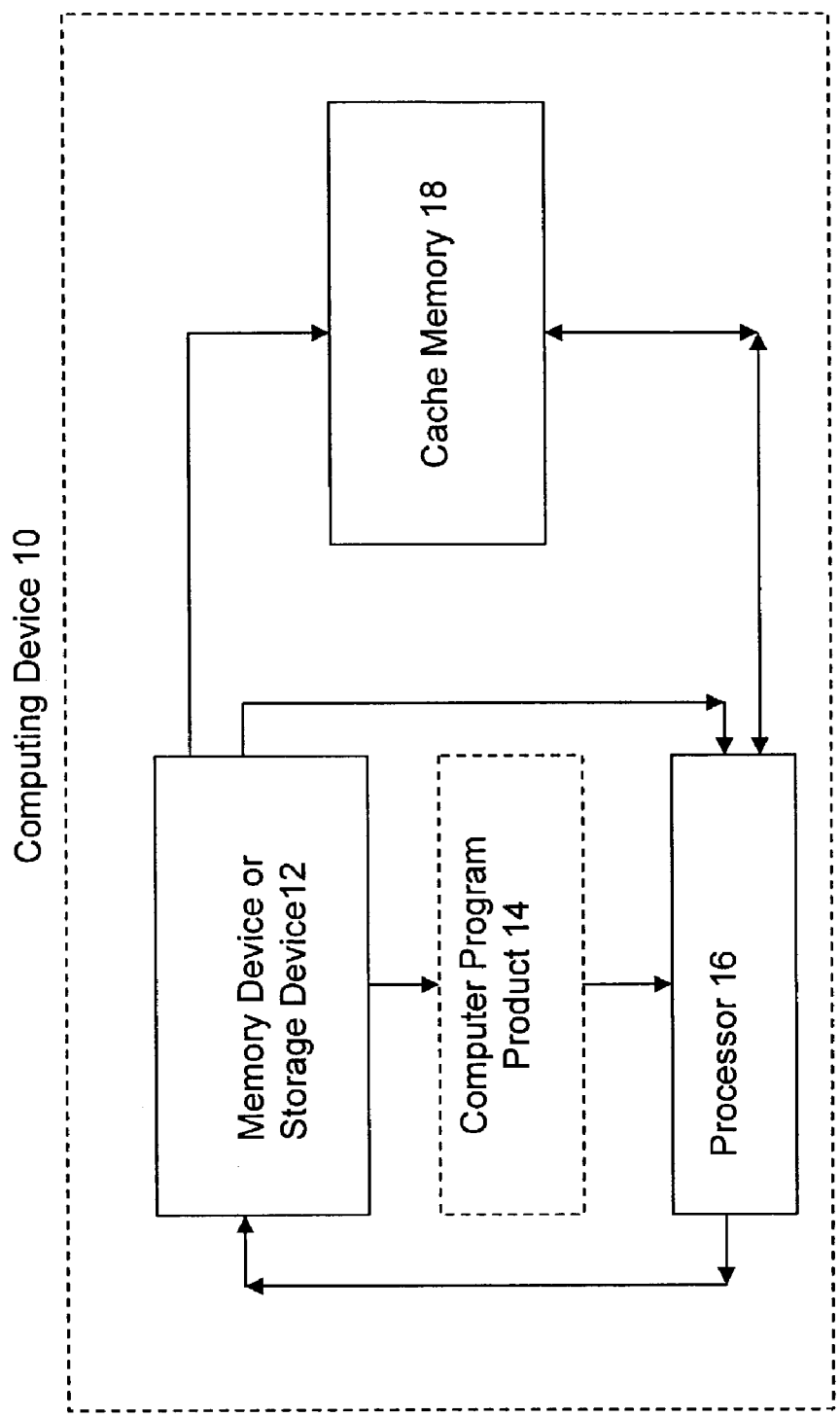
FIG. 4 illustrates a computing device executing adaptive prefetching according to an embodiment of the present invention.

FIG. 4 illustrates a computing device executing adaptive prefetching according to an embodiment of the present invention. A computing device 10 may include a processing device 16, a main memory 12, a cache memory 18, at least one source code program, a storage device 12, and a computer program product 14. The computer program product 14, e.g., a compiler, may compile a source code program to create executable output code. The source code program may be stored in the main memory 12 or the storage device 12. The executable output code may be stored in the main memory 12 or the storage device 12. The processor 16 may be utilized by the computer program product 14 to compile the at least one source code program. In order for the executable output code to run efficiently on the computer, the computer program product may determine statically, i.e., during compiling of the source code program, if certain conditions exist and may also determine dynamically, i.e., during execution of the output code, if certain conditions exist, to attempt to adaptively prefetch the necessary information from the storage device or the main memory to enable the data to be present in the cache memory 18 during execution of the output code. The computing device 10 may utilize the processor 16 to retrieve the output code from the main memory 12 or the storage device 12, to execute the output code including a conditional prefetch instruction, if certain conditions exist, and to load data retrieved utilizing the conditional prefetch instruction into a cache memory 18.

In an embodiment of the invention, the computer program product, e.g., the compiler, may determine during compilation of the source code 1) if the loop is accessed a sufficient number of times to achieve a performance gain from active prefetching; and 2) if an irregular load exists in the loop. In this embodiment of the invention, the computer program product may generate code to determine dynamically, i.e., during execution of the output code, whether the irregular load has a predictable access pattern. The computer program product may also insert a prefetch instruction into the output code, the prefetch instruction only being executed if certain conditions are met. This may be referred to as insertion of conditional adaptive prefetch code including a conditional prefetch instruction. If the computer program product determines statically that the loop was accessed a sufficient number of times and that an irregular load exists in the loop, and the generated code identifies that the irregular load has a predictable access pattern, then the conditional prefetch instruction in the inserted conditional adaptive prefetch code may be executed.

In an alternative embodiment of the present invention, the computer program product, e.g., the compiler, may determine statically, whether an irregular load exists in the loop. In this embodiment of the invention, the computer program product may generate code 1) to determine dynamically whether the loop is accessed a sufficient number of times to enable prefetching; 2) to identify whether the irregular load as a predictable access pattern; and 3) to execute the conditional adaptive prefetch code if certain conditions are met. If the complier determines statically that an irregular load exists in the loop, and the compiler-generated code determines dynamically that the loop is accessed a sufficient number of times and that the irregular load has a predictable access pattern, then the conditional prefetch instruction in the inserted conditional adaptive prefetch code may be executed.

In an embodiment of the invention, a source code program may include at least one loop. Although multiple loops may be present in the source code program, a source code program with one loop is presently described for simplicity of discussion. In an embodiment of the present invention, the computer program product may be a compiler. The computer program product may compile the source code program and create output code. The output code may be the actual executable code, e.g., when a user requests a program to be run, the output code or executable code is loaded by the processor into the memory of the computing device and executed.

In an embodiment of the present invention, a prefetch insertion module in a computer program product may insert conditional adaptive prefetch code into the output code. In this embodiment, an irregular load pattern determination module in a computer program product, e.g., a compiler, may insert pattern recognition code into the output code to calculate whether successive iterations of an irregular memory load in a loop have a predictable access pattern. If successive iterations of the irregular memory load have the predictable access pattern, the conditional prefetch instruction in the conditional adaptive prefetch code inserted into the output code may be executed and the irregular memory load corresponding to at least one future iteration of the loop may be retrieved. In this embodiment, if the predictable access pattern is not found when the program is run and the loop executed, the conditional prefetch instruction in the inserted conditional adaptive prefetching code may not be executed.

When the irregular memory load corresponding to at least one future iteration of the loop is retrieved, an entire cache line of data may be retrieved. In embodiments of the present invention, the entire cache line of data may include multiple, if not all, fields of a data structure, such as an array. This may mean that the irregular memory load corresponding to more than one successive future iterations of the loop may be loaded during execution of the conditional prefetch instruction. In embodiments of the invention, the conditional adaptive prefetching code may only be executed once because the prefetching retrieves the entire data structure.

In other words, the pattern recognition code is calculating whether successive memory addresses, i.e., addresses loaded during successive iterations of the loop, have a predictable pattern, when the loop is being executed. For example, FIGS. 1(a), 1(b) and 1(c) are successive iterations of memory loads according to an embodiment of the present invention. FIGS. 1(a) and 1(b) represent predictable access patterns and FIG. 1(c) represents an unpredicatble access pattern. As illustrated by FIG. 1(a), the memory addresses for loop iterations x=1–5are each 10 units or memory addresses apart, which may be a predictable access pattern. If the memory addresses are always a set distance apart, the condition may be referred to as having a constant stride.

FIG. 1(b) illustrates a predictable access pattern where the memory addresses for loop iterations x=1–5 varies, but varies in a uniform pattern. In between loop iteration x=1 and x=2, the distance between memory addresses is seven. In between loop iterations x=2 and x=3, the distance between memory addresses is five. The pattern of seven units or values and then five units or values between memory addresses is followed throughout the running of the loop. FIGS. 1(a) and 1(b) illustrate simple predictable access patterns. In other embodiments of the present invention, more complex access patterns may be calculated and recognized. FIG. 1(c) illustrates a non-predictable access pattern. In this example, the values of memory addresses for the next iteration or future iterations may not be predicted.

The number of iterations the loop runs may be variable. The number of iterations may be a constant value set by the user, or automatically established within the computer program product, e.g., compiler. Alternatively, the number of iterations may be determined dynamically during execution of the output code based on the variables defined within the output code. If the loop is called multiple times during the execution of the program, the number of iterations may change depending upon conditions or variables within the output code.

In embodiments of the present invention, a loop count module of the computer program product may check the usage count for the loop, i.e., the loop count module may calculate a number of times the loop may be accessed during either compilation or execution of the output code. For example, the loop count module, during compilation, may estimate that a loop is executed 100 times when a program is run by evaluating the loop in the source code and estimating how many times the loop may be executed given the variables defined within the source code. In an embodiment of the invention, if the number of times that the loop may be accessed is determined by the loop count module to exceed a pre-determined threshold value, the loop counting module may instruct the computer program product to not insert a prefetch instruction into the output code for the loop.

Alternatively, the loop count module of the computer program product, e.g., compiler, may insert loop counting code into the output code, where the loop counting code determines the number of times the loop may be accessed during the execution of the output code by counting the number of times the loop is accessed. If the loop counting code determines the number of times the loop may be accessed is greater than the threshold value, the inserted conditional adaptive prefetching code may be executed during output code execution.

In an alternative embodiment of the invention, the loop count module may statically, during compilation, make an estimation of a number of times the loop may be accessed based on static, compilation, or dynamic, execution or runtime, profiles. The profiles may be generated from previous runs of the computer program product where the loop count module statically estimates the number of times the loop is accessed or the loop counting code determines the number of times the loop was accessed during execution of the output code.

In embodiments of the present invention, an irregular load determination module in the computer program product may check a selected loop to determine if there is one irregularly accessed load inside the selected loop. An irregularly accessed load may be defined as a load where the computer program product, e.g., the compiler, may not be able to determine the address of the memory load for future iterations of the loop statically (during compilation from source code to output code). If the selected loop does not include the one irregularly accessed load inside the selected loop, the computer program product may not insert the conditional adaptive prefetch code into the output code for the selected loop.

The inserted conditional adaptive prefetching code may follow established loop construction principles or may be structured to allow predication. In embodiments of the invention, the inserted conditional prefetch code may include a loop as follows:

If (condition 1=true) (* condition 1 determines if there is a data prefetch *)
then
  {prefetch (first field of data for future iteration of loop)
  prefetch (ninth field of data for future iteration of loop)}
else
  {indicate no prefetch for the loop}
Execute next instruction In computer architectures that utilize predication, the conditional adaptive prefetch code may be structured as followed, if enough memory slots exist in the original loop, which removes the branch instruction.

Compare condition 1 prefetch, no prefectch=a,b
  Prefetch. prefectch first field of data; prefetch ninth field of data
  No Prefetch . . . do not execute prefetch Predication may be utilized providing it does not increase the length of the original loop.

As discussed previously, in alternative embodiments of the invention, more complicated access patterns may be recognized by the irregular load pattern determining module. For example, the irregular load pattern determining module may assume that the data accessed in the program includes a load at address offset 4, address offset 24, and address offset 32, and then repeats the same address pattern, i.e., 20 addresses between the first address (4) and the second address (24), and eight addresses between the second address offset and the third address offset. In this embodiment of the invention, the conditional adaptive prefetch code may be executed and the entire cache line of data may be prefetched. In this embodiment, the cache line of data may include the load at address offset 4, address offset 24, address offset 32, address offset 36, address offset 56 and address offset 64., etc.

The computer program product, e.g., the compiler, may determine statically whether multiple fields of the same structure are accessed in the loop. In this embodiment, the compiler may also determine if the multiple fields of the same structure that are accessed in the loop may be contained in the same cache line of data. If the multiple fields of the same structure are contained in the same cache line of data, the prefetch insertion module may insert conditional adaptive prefetch code that includes one prefetch instruction. In embodiments of the present invention where multiple fields of the same structure are not contained in the same cache line of data as determined by the computer program product during compilation, the prefetch insertion module may insert conditional adaptive prefetch code that includes more than one conditional prefetch instructions. For example, if two fields of the same array, i.e., structure, are not contained in the same cache line of data as determined statically by the complier, the prefetch insertion module may insert conditional adaptive prefetch code that includes two conditional prefetch instructions.

In an embodiment of the present invention, the original loop may include more than one irregular load, i.e., the load may be accessing two unique or separate structures. In one embodiment of the present invention, when the computer program product analyzes the source code, during compilation, the irregular load determining module may determine that more than one load in the loop is irregular. In embodiments of the invention, the irregular load determining module in the computer program product may assume that all of the remaining irregular loads in the loop have the same predictable access pattern. Thus, the prefetch insertion module may insert conditional adaptive prefetch code that includes more than one conditional prefetch instruction, where the conditional compare instructions are the same for the more than one conditional prefetch instruction. This condition, of the same predictable access pattern, may be assumed because the loop is accessed a set number of times and the irregular memory loads within the loop may all follow the same access pattern. This result may occur if regularity is present in the data access patterns in all irregular loads. Next, the irregular load pattern determining module may identify dynamically that one of the irregular loads has a predictable access pattern. Because of the assumption that all of the irregular loads follow the same access pattern, the more than one conditional prefetch instructions may be executed.

In an alternative embodiment of the present invention including multiple irregular loads in a loop, as determined by the irregular load determination module, the prefetch insertion module may insert conditional adaptive prefetch code with more than one conditional prefetch instruction into the output code. In this embodiment, the irregular load pattern determining module may insert pattern recognition code to examine each irregular load dynamically, i.e., during execution of the output code, to determine if each of the irregular loads have a predictable access pattern. For each of the irregular loads in the loop that have a predictable access pattern, a corresponding conditional prefetch instruction may be executed, e.g., if there are two irregular loads in the loop then a first and a second conditional prefetch instruction may be executed. The corresponding conditional prefetch instruction for each of the irregular loads in the loop may be slightly different because of the different predictable access patterns. For example, the first conditional prefetch instruction may retrieve data with a stride of 10 memory addresses and the second conditional prefetch instruction may retrieve data with a stride of 25 memory addresses.

In an alternative embodiment of the present invention, the irregular load pattern determining module may identify that more than one of the irregular loads in the loop have the same predictable access pattern and at least one other irregular load has a unique access pattern. Illustratively, in an embodiment of the invention where more than one of the irregular loads in the loop have the same predictable access pattern and one other irregular load has a unique access pattern, a first corresponding prefetch instruction may be executed for the more than one irregular loads in the loop with the same predictable access pattern and a second corresponding prefetch instruction may be executed for the irregular load with the unique access pattern.

FIG. 2 is sample pseudo-code illustrating the computer program product generated output code for adaptive prefetching according to an embodiment of the present invention. FIG. 2 illustrates pseudo-code that represents source code that may be compiled and inserted into output code as either regular executable output code or conditional executable output code.

In this embodiment of the present invention, two loops may be inserted inside the output code which was the original loop. The loops may be referred to as a probe loop and a long loop. The probe loop, i.e., lines 7–19, determines if the original loop has a predictable access pattern and the long loop, lines 22–32 inserts the prefetch instruction into the output code of the original loop. Thus, in this specific embodiment, the probe loop is the irregular loop pattern determining module and the long loop is the prefetch insertion module. In this embodiment, the probe loop is determining whether successive iterations of the irregular load in the loop have a constant stride. If the end condition of the original loop is reached, then control exits to the next statement of the original loop. This action may preserve the semantics of the original loop even when the irregular loop pattern determining module and the prefetch insertion module are run.

As illustrated in FIG. 2, line 1 indicates that the initialization of a running pointer to the head of a linked list, i.e., p=head represents the initialization of the pointer p to the start of the linked list, which is denoted by head. The structure field accesses of the node pointed to by p represent the irregular loads within the loop that may have a predictable access pattern. Line 2 represents that when the link list is not yet fully traversed, meaning until p becomes empty, the probe loop and the long loop may run. As represented in lines 3–8, before the probe loop actually is executed, variables are set to initial values, such as i=1; the boolean variable const_stride=TRUE (meaning the default value is that there is a constant stride in the irregular memory load); and the memory address of the previous node is initialized to the memory address of the start of the linked list, i.e., pold=p. This probe loop may run as long as it is not NULL and as long as i is less than the variable NPROBE, the calculation of which is described previously. The variable NPROBE may be determined by the computer program product and may vary depending on the length on the type of program and other factors. For example, tests may reveal that adaptive prefetching has superior performance capabilities when 11 iterations of the irregular memory load are determined to have a predictable access pattern, in this case a constant stride. Thus, in this embodiment, NPROBE may be set to 11.

Once inside the probe loop, as illustrated in lines 9–11, the loop incrementing variable is incremented, and the stride, i.e., pstride, is calculated by subtracting the memory address of the previous linked list node from the memory address of the current linked list node. During the initial iteration or iterations of the probe loop, the actual comparison of the stride for successive addresses may not occur because not enough data has been compiled. During these initial iterations, the address for pold will be set to the address for p, and the prev_pstride variable may be set to the current stride, i.e., pstride.

As illustrated in lines 15–18 in FIG. 2, the actual loop operation may be performed, denoted here by the subroutine Work(p), that may involve accessing various fields within the linked list node pointed to by p. At the end of the loop, p is updated to point to the next node of the linked list. Once a sufficient number of stride values have been calculated, the condition within the probe loop may make the comparison of the stride length between the successive addresses, i.e., prev_pstride and pstride. In this embodiment of the present invention, if the stride length for any successive addresses in the probe loop is not constant, then the const_stride boolean variable may be set to false. For example, if NPROBE=8, and the stride between addresses 3 and 4 is 6, the stride between addresses 4 and 5 is 6; the stride between addresses 5 and 6 is 6; the stride between addresses 6 and 7 is 6; and the stride between addresses 7 and 8 is 10, then p_stride may be set to false which means the irregular memory load does not have a constant stride.

As illustrated by lines 20–32 of FIG. 2, the long loop may be executed. The loop incrementing variable may be reset to 1, i.e., i=1. While there are still iterations of the loop left for the irregular memory load, i.e., while (p), and while i is less than or equal to NLONG, the long loop incrementing variable may be incremented., i.e., while (I<NLONG). NLONG corresponds to NPROBE in that NLONG is normally much greater than NPROBE.

The computer program product, e.g., the compiler, may determine statically, during compilation, or dynamically, during output code execution or runtime, the values for the NLONG and the NPROBE variables. In the NPROBE loop, the compiler has inserted extra instructions to keep track of the previous stride, i.e., to determine if the constant stride exists, and to determine old values of the array p. These extra instructions are overhead and may lead to performance slowdown. The total overhead for adaptive prefetching is proportional to NPROBE/(NPROBE+NLONG). Thus, the computer program product may want to keep the overhead as minimal as possible, and may select NLONG>>NPROBE.

In this embodiment, if the stride was constant for NPROBE iterations of the irregular load, a prefetch instruction is executed and the contents of a future memory address are loaded into a cache memory for future use. In FIG. 2, the prefetch instruction is executed twice because data in two fields is required for the irregular memory load.

The overhead required to execute the code in FIG. 2 may be minimal. The computer program product may determine the overheads of code-size expansion from applying techniques of this invention and may weigh these overheads against the potential benefits of the invention in terms of decreased software execution times due to less data stalls. This result allows there to be minimal overheads for loops that do not receive the benefit of the invention, because they do not exhibit regularity in access dynamically, i.e., at runtime. In other words, there will be minimum overheads if a constant address stride does not exist.

Figure 3:
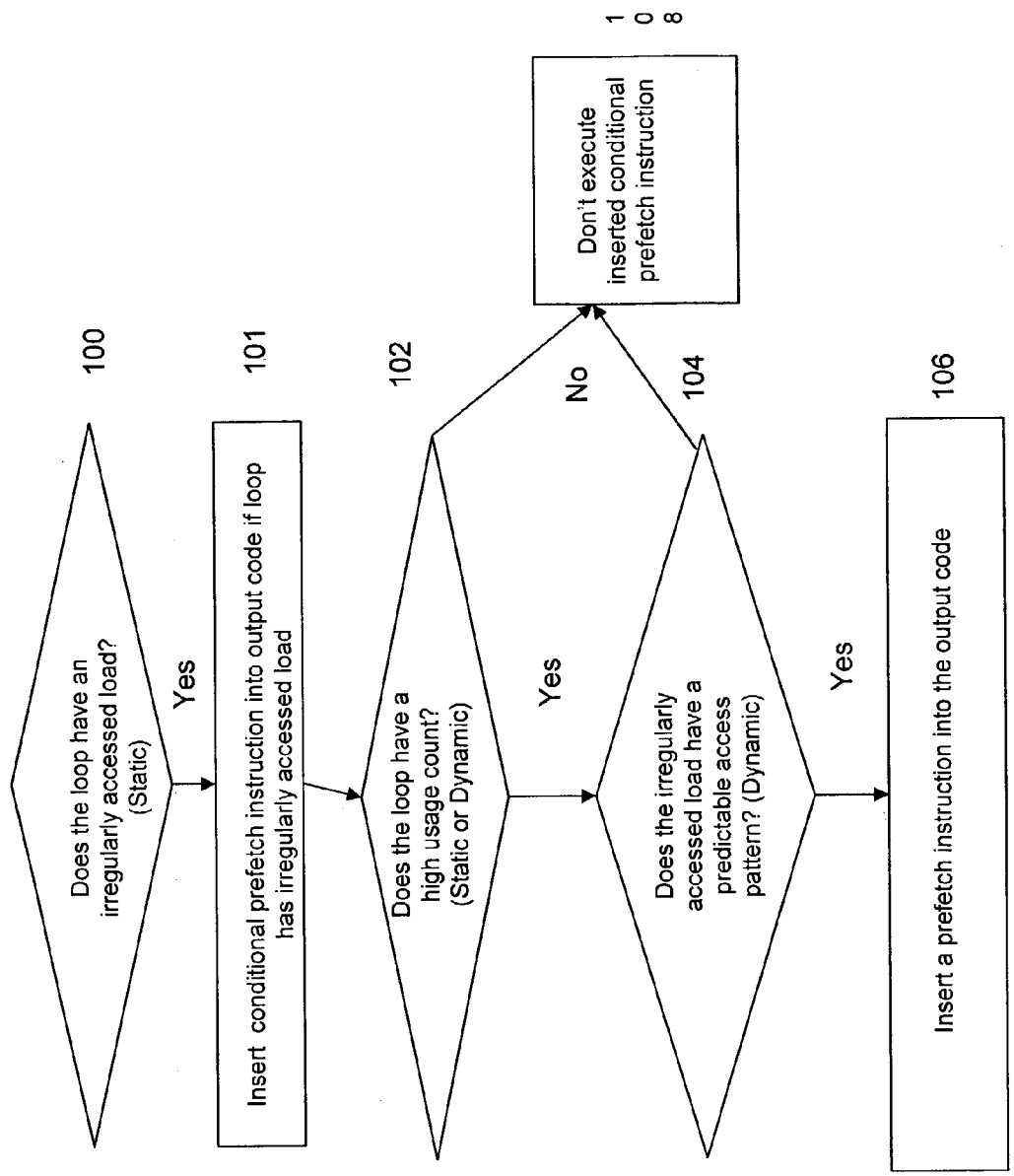
FIG. 3 illustrates an adaptive prefetching flowchart according to an embodiment of the present invention.

FIG. 3 illustrates adaptive prefetching according to an embodiment of the present invention. A computer program product, e.g., a compiler, statically determines 100 whether a loop has an irregularly accessed load. If the computer program product statically determines the loop has an irregularly accessed load, the computer program product statically or dynamically inserts 101 conditional adaptive prefetch code into the output code. If the computer program product statically determines the loop has an irregularly accessed load count, the computer program product, statically or dynamically, determines 102 whether the loop has a high usage count. If the loop has a high usage count, the computer program product dynamically calculates 104 whether successive iterations of the irregular memory load in the loop have a predictable access pattern. If the loop does not have a high usage count, the conditional prefetch code is not executed 108 by the computer program product. If the computer program product determines successive iterations of the irregular memory load in the loop have a predictable access pattern, the computer program product dynamically executes 106 an inserted prefetch instruction in the conditional adaptive prefetch code for the irregular memory load. If the computer program product determines successive iterations of the irregular memory do not have a predictable access pattern, the computer program produce does not execute 108 the inserted prefetch instruction While the description above refers to particular embodiments of the present invention, it should be readily apparent to people of ordinary skill in the art that a number of modifications may be made without departing from the spirit thereof. The accompanying claims are intended to cover such modifications as would fall within the true spirit and scope of the invention. The presently disclosed embodiments are, therefore, to be considered in all respects as illustrative and not restrictive, the scope of the invention being indicated by the appended claims rather than the foregoing description. All changes that come within the meaning of and range of equivalency of the claims are intended to be embraced therein.

What is claimed is:

1. A method of data prefetching, comprising:
   calculating whether each of at least one irregular memory loads in a loop has a predictable access pattern;
   executing conditional adaptive prefetch code including a prefetch instruction if one of the at least one irregular memory loads in the loop has the predictable access pattern; and
   determining whether the loop is accessed a predetermined amount of times, and if the loop is accessed a sufficient number of times, then calculating whether each of the at least one irregular memory loads has the predictable access pattern and executing the conditional adaptive prefetch code including the prefetch instruction if one of the at least one irregular memory loads in the loop has the predictable access pattern.

2. The method of claim 1, wherein the predictable access pattern is a constant stride.

3. The method of claim 1, further including determining a number of iterations ahead of utilization the at least one irregular memory load is prefetched.

4. The method of claim 1, wherein calculating whether each of the at least one irregular memory loads in the loop has the predictable access pattern occurs once every predetermined number of iterations of the loop.

5. The method of claim 1, wherein the executing of the conditional adaptive prefetch code includes a second prefetch instruction.

6. An executable code storage device, comprising:
a machine-readable storage medium; and
machine-readable executable code, stored on the machine-readable storage medium, the machine-readable program code having instructions, which when executed cause a computer to:
calculate whether each of at least one memory loads in a loop has a predictable access pattern;
execute conditional adaptive prefetch code including a prefetch instruction if one of the irregular memory loads in the loop has the predictable access pattern; and
determine whether the loop is accessed a predetermined amount of times, and if the loop is accessed a predetermined number of times, to calculate whether each of the at least one irregular memory loads has the predictable access pattern and to execute the conditional adaptive prefetch code including the prefetch instruction if one of the at least one irregular memory loads in the loop has the predictable access pattern.

7. The executable code storage device of claim 6, wherein the predictable access pattern is a constant stride.

8. The executable code storage device of claim 6, including instructions, which when executed cause the computer to determine the number of iterations ahead of utilization the at least one irregular memory load is prefetched.

9. The executable code storage device of claim 6, including instructions, which when executed cause the computer to calculate whether each of the irregular memory loads in the loop has the predictable access pattern once every predetermined number of iterations of the loop.

10. The executable code storage device of claim 6, wherein the executing of the conditional adaptive prefetch code includes a second prefetch instruction.

11. A computer program product for compiling a source code program into output code, said source code program having a loop therein, said computer program product stored on a machine-readable storage medium including instructions, which when executed which cause a computer to:
determine whether the loop has an irregular memory load during the compiling of the source code program;
insert pattern recognition code into the output code to calculate whether successive iterations of the irregular memory load in the loop have a predictable access pattern during the compiling of the source code program; and
implant conditional adaptive prefetch code including a prefetch instruction into the output code during the compiling of the source code program.

12. The computer program product of claim 11, wherein the predictable access pattern is a constant stride.

13. The computer program product of claim 11, including instructions, which when executed cause the computer to determine whether the loop has a high usage count, wherein if the loop has the high usage count, determine whether the loop has the irregular memory load, insert the pattern recognition code into the output code to calculate whether successive iterations of the irregular memory load in the loop have a predictable access pattern, and implant conditional adaptive prefetch code including a prefetch instruction into the output code each occur if the loop has the high usage count.

14. The computer program product of claim 11, further including instructions, which when executed cause the computer to insert loop counting code into the output code to determine whether the loop has a high usage count.

15. The computer program product of claim 11, including instructions, which when executed causes the computer to implant a predicated prefetch instruction into the output code if the computer on which the computer program product is running supports predication.

16. A computer program product for compiling a source code program into output code, said source code program having a loop therein, said computer program product stored on a machine-readable storage medium including instructions, which when executed cause a computer to:
determine whether the loop has at least one irregular memory load during compiling of the source code program;
insert pattern recognition code into the output code to calculate whether successive iterations of each of the at least on irregular memory loads in the loop has a first predictable access pattern during compiling of the source code program if the loop has the at least one irregular memory load; and
implant conditional adaptive prefetch code including a prefetch instruction into the output code during compiling of the source code program if the loop has the at least one irregular memory load.

17. A computer program product for compiling a source code program into output code, said source code program having a loop therein, said computer program product stored on a machine-readable storage medium including instructions, which when executed cause a computer to:
determine whether the loop has at least one irregular memory load during compiling of the source code program;
insert pattern recognition code into the output code to calculate whether successive iterations of each of the at least on irregular memory loads in the loop has a first predictable access pattern during compiling of the source code program if the loop has the at least one irregular memory load;
implant conditional adaptive prefetch code including a prefetch instruction into the output code during compiling of the source code program if the loop has the at least one irregular memory load; and
to implant conditional adaptive prefetch code including an additional prefetch instruction for each of the at least one irregular memory loads in the loop that have a different predictable access pattern than the first predictable access pattern if the loop has more than one irregular memory load.

* * * * *